(12) United States Patent
Higashi

(10) Patent No.: US 8,830,397 B2
(45) Date of Patent: Sep. 9, 2014

(54) DISPLAY DEVICE, DISPLAY SYSTEM, MOBILE INFORMATION TERMINAL, AND DISPLAY DEVICE CONTROL METHOD

(71) Applicant: Funai Electric Co., Ltd., Osaka (JP)

(72) Inventor: Norihiro Higashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/040,818

(22) Filed: Sep. 30, 2013

(65) Prior Publication Data

US 2014/0098291 A1  Apr. 10, 2014

(30) Foreign Application Priority Data

Oct. 5, 2012  (JP) ................................. 2012-223385

(51) Int. Cl.
- *H04N 7/00*  (2011.01)
- *H04M 3/42*  (2006.01)
- *H04M 3/00*  (2006.01)
- *G09G 5/00*  (2006.01)
- *H04N 5/44*  (2011.01)

(52) U.S. Cl.
CPC ............. *H04N 5/4403* (2013.01); *G09G 5/001* (2013.01)
USPC .......................... 348/552; 455/418; 455/414.1

(58) Field of Classification Search
USPC .................. 348/552, 553; 345/428; 709/203; 455/418–420, 414.1, 556.1
See application file for complete search history.

(56) References Cited

U.S. PATENT DOCUMENTS

| 7,554,614 | B2 | 6/2009 | Satou | |
|---|---|---|---|---|
| 2007/0277216 | A1 | 11/2007 | Nakajima | |
| 2008/0046950 | A1 | 2/2008 | Nakajima | |
| 2009/0051824 | A1 | 2/2009 | Satou | |
| 2011/0285916 | A1 | 11/2011 | Takiduka | |
| 2013/0138728 | A1* | 5/2013 | Kim et al. | 709/203 |
| 2013/0328878 | A1* | 12/2013 | Stahl et al. | 345/428 |

FOREIGN PATENT DOCUMENTS

| JP | 2005-269137 | 9/2005 |
|---|---|---|
| JP | 2007-311927 | 11/2007 |
| JP | 2008-048136 | 2/2008 |
| JP | 2008-219672 | 9/2008 |
| JP | 2011-239286 | 11/2011 |
| JP | 2011-244391 | 12/2011 |

\* cited by examiner

*Primary Examiner* — Michael Lee
(74) *Attorney, Agent, or Firm* — Wenderoth, Lind & Ponack, L.L.P.

(57) ABSTRACT

A display device includes: a second shared memory which is used for sharing data with a smartphone, and into which an identification information item of a process corresponding to a hardware key included in the smartphone is written from the smartphone; a second identification information receiving unit which receives the identification information item from the smartphone by reading the identification information item from the second shared memory; and a second identification information transmitting unit which transmits information indicating selection of the identification information item to the smartphone, by writing the information in the second shared memory.

10 Claims, 20 Drawing Sheets

FIG. 5

| Identification information items | | Selection flag |
|---|---|---|
| Identification number | Process name | |
| 1 | Return | 0 |
| 2 | Menu | 0 |
| 3 | Home | 0 |
| 4 | Search | 0 |
| 5 | Volume up | 0 |
| 6 | Volume down | 0 |

FIG. 6

| Identification information items | |
|---|---|
| Identification number | Process name |
| 1 | Return |
| 2 | Menu |
| 3 | Home |
| 4 | Search |
| 5 | Volume up |
| 6 | Volume down |

FIG. 10

| Identification information items | | Selection flag |
|---|---|---|
| Identification number | Process name | |
| 1 | Return | 0 |
| 2 | Menu | 0 |
| 3 | Home | 0 |
| 4 | Search | 1 |
| 5 | Volume up | 0 |
| 6 | Volume down | 0 |

FIG. 14

| Identification information items | | Selection flag |
|---|---|---|
| Identification number | Process name | |
| 1 | Return | 0 |
| 2 | Menu | 0 |
| 3 | Home | 0 |
| 4 | Search | 0 |
| 5 | Volume up | 0 |
| 6 | Volume down | 0 |
| 7 | Screen shot | 0 |

FIG. 16

| Identification information items | | Selection flag |
|---|---|---|
| Identification number | Process name | |
| 1 | Return | 0 |
| 2 | Menu | 0 |
| 3 | Home | 0 |
| 4 | Search | 0 |
| 5 | Volume up | 0 |
| 6 | Volume down | 0 |
| 7 | Screen shot | 1 |

DISPLAY DEVICE, DISPLAY SYSTEM, MOBILE INFORMATION TERMINAL, AND DISPLAY DEVICE CONTROL METHOD

CROSS REFERENCE TO RELATED APPLICATION(S)

The present application is based on and claims priority of Japanese Patent Application No. 2012-223385 filed on Oct. 5, 2012. The entire disclosure of the above-identified application, including the specification, drawings and claims is incorporated herein by reference in its entirety.

FIELD

The present invention relates to display devices, and particularly relates to a display device which is connected to a mobile information terminal and displays video received from the mobile information terminal.

BACKGROUND

Conventionally, Mobile High-definition Link (MHL) has been proposed as a standard for communication interfaces for connecting a smartphone and a television and realizing charging of the smartphone and transmission of a video signal decoded by the smartphone to the television (for example, see Patent Literature 1). MHL is a standard for interfaces for transmitting video at high speed and are intended for mobile information terminals represented by smartphones, and so on.

In MHL, it is possible to perform standard smartphone key operations, using the remote controller (hereafter referred to as "remote") of a television. For example, a user's operation of cursor keys of the remote can cause the cursor displayed on the screen of the smartphone to move.

CITATION LIST

Patent Literature

[Patent Literature 1] Japanese Unexamined Patent Application Publication No. 2011-244391

SUMMARY

Technical Problem

However, operation of hardware keys which are physical keys disposed outside the screen of a smartphone is not supported by MHL. As such, there are smartphone processes that cannot be operated using the remote of a television.

FIG. 20 to FIG. 22 are external views of an example of a hardware key portion of a smartphone. In the smartphone shown in FIG. 20, hardware keys are arranged in the order of, from the left, a return key 1001, a menu key 1002, a search key 1003, and a home key 1004. The smartphone shown in FIG. 21 includes the same type of hardware keys as the smartphone shown in FIG. 20 but with a different layout. Specifically, in the smartphone shown in FIG. 21, hardware keys are arranged in the order of, from the left, the return key 1001, the menu key 1002, the home key 1004, and the search key 1003. The smartphone shown in FIG. 22 does not include the menu key 1002 and the search key 1003 which are included in the smartphones shown in FIG. 20 and FIG. 21, but includes a task key 1005 which is not included in the smartphones shown in FIG. 20 and FIG. 21. Specifically, in the smartphone shown in FIG. 22, hardware keys are arranged in the order of, from the left, the task key 1005, the home key 1004, and the return key 1001. With the pressing of any one of the hardware keys by the user, the smartphone executes the process associated with the pressed hardware key. For example, when the user presses the search key 1003, the smartphone connects to a search site and displays the webpage screen of the search site. However, it is not possible to cause the smartphone to execute such a search process, by using the television remote.

As described above, operation of hardware keys of a smartphone is not supported by MHL. In addition, hardware key positions and types are different depending on the smartphone. As such, it is difficult to cause a smartphone (mobile information terminal) to execute a process associated with a hardware key, by operating a television (display device).

The present invention is conceived in order to solve the aforementioned problem and has as an object to provide a display device, and so on, which, through the operation of the display device by a user, is capable of causing a mobile information terminal to execute a process associated with a hardware key.

Solution to Problem

In order to achieve the aforementioned object, a display device according to an aspect of the present invention includes: a shared memory which is used for sharing data with a mobile information terminal, and into which one or more identification information items of respective processes corresponding to one or more hardware keys included in the mobile information terminal are written from the mobile information terminal; an identification information receiving unit configured to receive the one or more identification information items from the mobile information terminal, by reading the one or more identification information items from the shared memory; and an identification information transmitting unit configured to transmit, to the mobile information terminal, information indicating selection of one of the one or more identification information items, by writing the information into the shared memory.

According to this configuration, the display device receives, from the mobile information terminal, the identification information item of the process associated with the hardware key of the mobile information terminal, via the shared memory. The identification information transmitting unit transmits information indicating the selection of an identification information item to the mobile information terminal, via the shared memory. As such, the mobile information terminal can execute the process corresponding to the identification information item selected at the display device-side. By operating the display device, the user can cause the mobile information terminal to execute the process associated with the hardware key. Furthermore, the identification information receiving unit receives the identification information item from the mobile information terminal. As such, regardless of the type of mobile information terminal that is connected to the display device, the user can cause the mobile information terminal to execute the process associated with the hardware key, by operating the display device.

Furthermore, the above-described display device may further include: a display control unit configured to display, on a screen of the display device, menu information having the one or more identification information items received by the identification information receiving unit as corresponding one or more menu entries; and a selection signal receiving unit configured to receive a selection signal indicating a menu entry selected by a user from among the one or more menu entries included in the menu information, wherein the identification information transmitting unit may be configured to transmit, to the mobile information terminal, information indicating selection of the identification information item corresponding to the menu entry indicated by the selection signal received by the selection signal receiving unit, by writing the information into the shared memory.

According to this configuration, by displaying the received identification information items on the screen as menu information, the display device can cause the user to select an identification information item using the remote, or the like, of the display device. The identification information transmitting unit transmits the information indicating the selection of any one of the identification information items included in the menu information to the mobile information terminal, via the shared memory. As such, the mobile information terminal can execute the processes corresponding to the identification information item selected at the display device-side. In this manner, by operation the display device, the user can cause the mobile information terminal to execute the process associated with the hardware key. Furthermore, the identification information receiving unit receives the identification information item from the mobile information terminal. As such, regardless of the type of mobile information terminal that is connected to the display device, the user can cause the mobile information terminal to execute the process associated with the hardware key, by operating the display device.

For example, the identification information receiving unit may be further configured to receive, from the mobile information terminal, an identification information item of a process that is executed through simultaneous pressing of two or more of the hardware keys, by reading the identification information item from the shared memory.

According to this configuration, it is possible to cause the mobile information terminal to execute a process that is executed through the simultaneous pressing of two or more of the hardware keys, through the operation of the display device by the user.

Furthermore, the mobile information terminal may include a first scratch pad which is a Mobile High-definition Link (MHL) scratch pad, the shared memory may be a second scratch pad which is an MHL scratch pad, and the identification information receiving unit may be configured to receive, from the mobile information terminal, the one or more identification information items that are written into the second scratchpad by being written into the first scratch pad by the mobile information terminal, by reading the one or more identification information items from the second scratch pad.

MHL has a mechanism for synchronizing the data stored in the respective scratch pads of both the source device and the sink device which are interconnected by an MHL cable or the like. Specifically, when data stored in one of the first scratch pad and the second scratch pad is updated through the addition, changing, deletion, and so on, of data, such updating is also reflected in the other. Thus, by way of the mobile information terminal writing an identification information item into the first scratch pad, the same identification information item is written into the second scratch pad. Therefore, the identification information receiving unit is capable of receiving identification information item from the mobile information terminal by reading the identification information item from the second scratch pad, and is thus capable of receiving the identification information using a simple method.

Furthermore, each of the first scratch pad and the second scratch pad may store, for each of the processes of the mobile information terminal, the identification information item of the process and a flag information item indicating whether or not a selection signal corresponding to the process is received, and the identification information transmitting unit may be configured to transmit, to the mobile information terminal, the identification information item corresponding to the selection signal received by the selection signal receiving unit, by updating the flag information item stored in the first scratch pad which is the flag information item of the process corresponding to the selection signal received by the selection signal receiving unit, by updating the flag information item stored in the second scratch pad, which corresponds to the flag information stored in the first scratch pad.

According to this configuration, by updating the flag information items stored in the second scratch pad, the flag information items stored in the first scratch pad are updated. As such, the identification information transmitting unit can notify the mobile information terminal of a selected identification information item, using a simple method.

Furthermore, the above-described display device may further include: an image receiving unit configured to receive one or more icon images of the corresponding one or more hardware keys from the mobile information terminal; a display control unit configured to display the one or more icon images on a screen of the display device; and a selection signal receiving unit configured to receive a selection signal of one of the one or more icon images displayed on the screen, wherein the identification information transmitting unit may be configured to transmit, to the mobile information terminal, information indicating selection of the identification information item of the process of the hardware key corresponding to the icon image indicated by the selection signal received by the selection signal receiving unit, by writing the information into the shared memory.

According to this configuration, icon images of the hardware keys of the mobile information terminal are displayed on the screen of the display device. By selecting an icon image by operating the remote, or the like, of the display device, the user is able to operate the mobile information terminal. As such, the user can intuitively select the identification information item of a process of the mobile information terminal, compared to the case of selecting the identification information item from the menu information.

A display system according to another aspect of the present invention includes: a mobile information terminal; and a display device, wherein the mobile information terminal includes: a first shared memory used for sharing data with the display device; a first identification information transmitting unit configured to transmit, to the display device, an identification information item of a process corresponding to a hardware key included in the mobile information terminal, by writing the identification information item into the first shared memory; a first identification information receiving unit configured to receive, from the display device, information indicating that the identification information item is selected by the display device, by reading the information from the first shared memory; and a process executing unit configured to execute the process indicated by the identification information item corresponding to the information received by the first identification information receiving unit, and the display device includes: a second shared memory used for sharing data with the mobile information terminal, the data being synchronized with data stored in the first shared memory; a second identification information receiving unit configured to receive the identification information item from the mobile information terminal, by reading the identification information item from the second shared memory; and a second identification information transmitting unit configured to transmit, to the mobile information terminal, the information indicating the selection of the identification information item, by writing the information into the second shared memory.

According to this configuration, the display device receives, from the mobile information terminal, the identification information item of the process associated with the hardware key of the mobile information terminal, via the first shared memory and the second shared memory. The second identification information transmitting unit transmits information indicating the selection of an identification information item to the mobile information terminal, via the second shared memory and the first shared memory. As such, the mobile information terminal can execute the process corresponding to the identification information item selected at the display device-side. By operating the display device, the user can cause the mobile information terminal to execute the process associated with the hardware key. Furthermore, the second identification information receiving unit receives the identification information item from the mobile information terminal. As such, regardless of the type of mobile information terminal that is connected to the display device, the user can cause the mobile information terminal to execute the process associated with the hardware key, by operating the display device.

A mobile information terminal according to yet another aspect of the present invention includes: a shared memory used for sharing data with a display device; an identification information transmission unit configured to transmit, to the display device, an identification information item of a process corresponding to a hardware key included in the mobile information terminal, by writing the identification information item into the shared memory; an identification information receiving unit configured to receive, from the display device, information written in the shared memory and indicating that the identification information item is selected by the display device, by reading the information from the shared memory; and a process executing unit configured to execute the process indicated by the identification information item corresponding to the information received by the identification information receiving unit.

According to this configuration, the identification information transmitting unit transmits the identification information item of the process associated with the hardware key of the mobile information terminal to the display device, via the shared memory. The identification information receiving unit receives information indicating that an identification information item has been selected by the display device, from the display device via the shared memory. As such, the mobile information terminal can execute the process corresponding to the identification information item selected at the display device-side. By operating the display device, the user can cause the mobile information terminal to execute the process associated with the hardware key. Furthermore, the identification information transmitting unit transmits the identification information item to the display device. As such, regardless of the type of mobile information terminal that is connected to the display device, the user can cause the mobile information terminal to execute the process associated with the hardware key, by operating the display device.

It should be noted that the present invention can be realized not only as a display device including such characteristic processing unit, but also as a display device control method including, as steps, the processes executed by the characteristic processing units included in the display device. Furthermore, the present invention can also be realized as a program for causing a computer to function as the characteristic processing units included in the display device or as a program which causes a computer to execute the characteristic steps included in the display device control method. In addition, it goes without saying that such a program can be distributed via a non-statutory computer-readable recording medium such as a CD-ROM (Compact Disc-Read Only Memory) and via a communication network such as the Internet.

Advantageous Effects

According to the present invention, it is possible to cause a mobile information terminal to execute a process associated with a hardware key through operation of a display device by a user.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a table showing an example of identification information items and selection flags written into a first shared memory by a first identification information transmitting unit.

FIG. 6 is a table showing an example of identification information items read from a second shared memory by a second identification information receiving unit.

FIG. 10 is a table for describing a process of updating the selection flags, performed by the second identification information transmitting unit.

FIG. 14 is a table showing an example of identification information items and selection flags written into the first shared memory by the first identification information transmitting unit.

FIG. 16 is a table for describing a process of updating selection flags when a seventh menu entry is selected.

DESCRIPTION OF EMBODIMENTS

Hereinafter, exemplary embodiments of the present invention shall be described in detail using the Drawings. It should be noted that the embodiments described hereinafter illustrate preferred specific examples of the present invention. The numerical values, shapes, materials, structural elements, the arrangement and connection of the structural elements, steps, the processing order of the steps etc. shown in the following exemplary embodiments are mere examples, and therefore do not limit the present invention, the scope of which is defined in the appended Claims and their equivalents. Therefore, among the structural elements in the following embodiment, structural elements not recited in any one of the independent claims defining the most generic part of the present invention are not necessarily required to overcome the object of the present invention, but are described as structural elements of a more preferable form.

Embodiment 1

Figure 1:
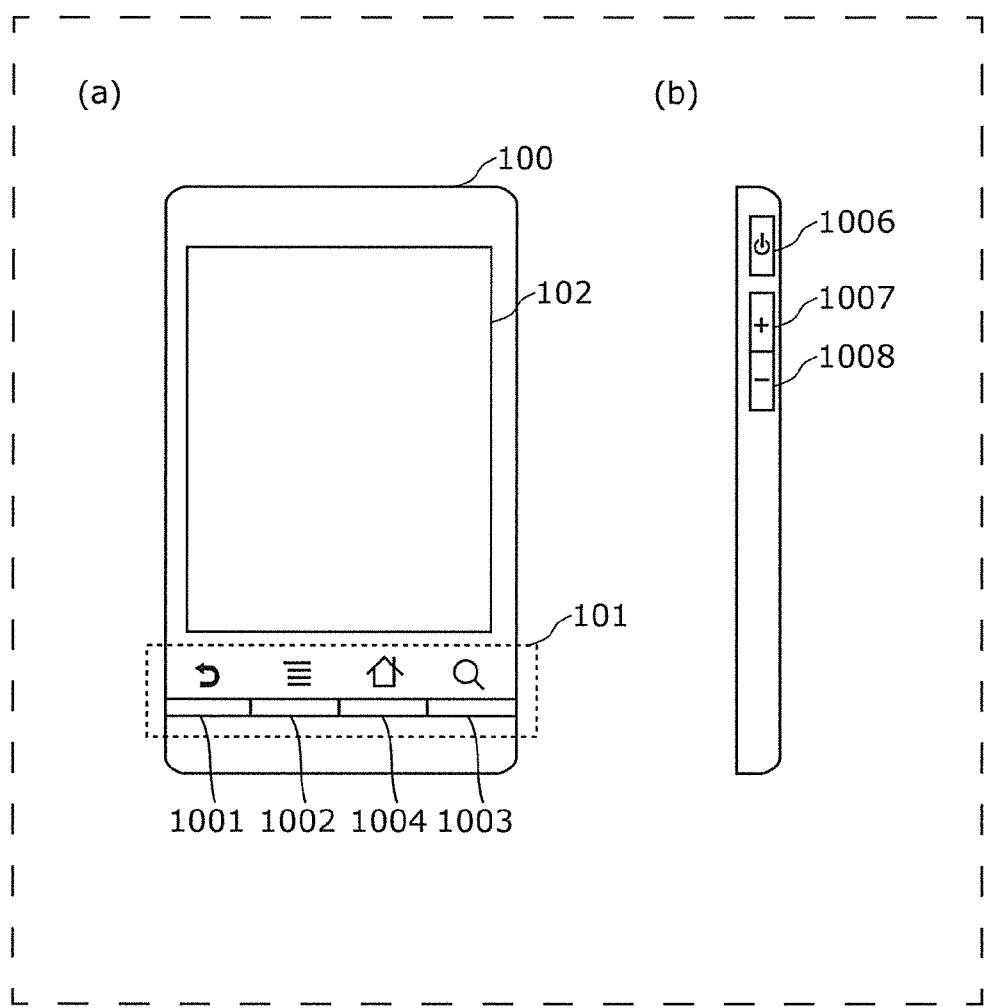
FIG. 1 is an external view of a typical smartphone; (a) is a front view of the smartphone and (b) is a right side view of the smartphone.

FIG. 1 is an external view of a typical smartphone; (a) is a front view of the smartphone and (b) is a right side view of the smartphone. As shown in (a) in FIG. 1, a smartphone 100 includes a screen 102 for displaying an image or video, and a hardware key group 101 for operating the smartphone 100. The hardware key group 101 includes the return key 1001, the menu key 1002, the home key 1004, and the search key 1003. Furthermore, as shown in (b) in FIG. 1, the smartphone 100 includes a power key 1006, a volume up key 1007, and a volume down key 1008.

With the pressing of any one of these hardware keys by the user, the smartphone 100 executes the process associated with the pressed hardware key. When the return key 1001 is pressed, the smartphone 100 executes a process for switching the image displayed on the screen 102 to the immediately preceding image. When the menu key 1002 is pressed, the smartphone 100 displays a menu image on the screen 102. When the home key 1004 is pressed, the smartphone 100 displays a predetermined home image on the screen 102. When the search key 1003 is pressed, the smartphone 100 executes a search process. When the power key 1006 is pressed, the smartphone 100 switches the power source, from ON to OFF or from OFF to ON. When the volume up key 1007 is pressed, the smartphone 100 increases the volume of a speaker. When the volume down key 1008 is pressed, the smartphone 100 decreases the volume of the speaker.

Figure 2:
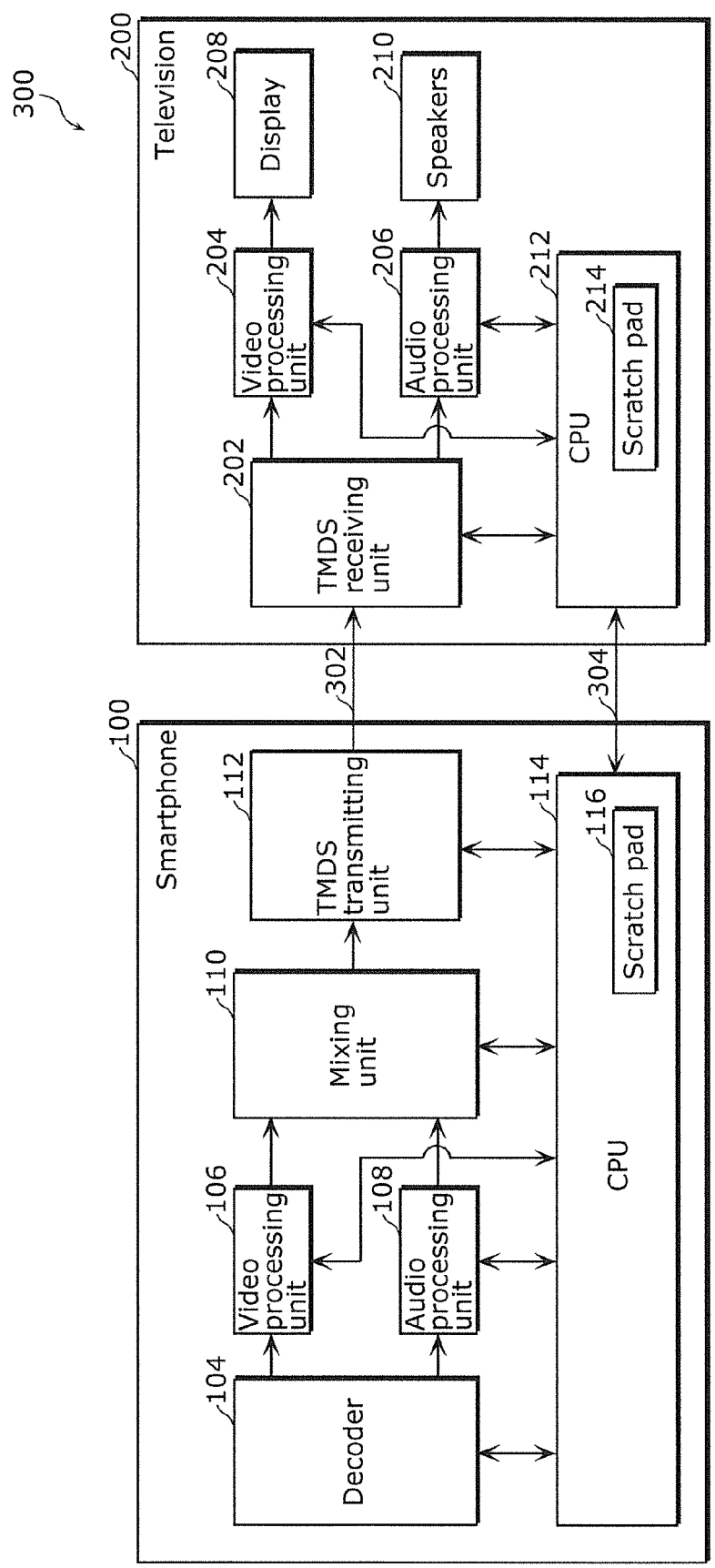
FIG. 2 is a diagram showing a hardware configuration of a display system according to Embodiment 1 of the present invention.

FIG. 2 is a diagram showing a hardware configuration of a display system according to Embodiment 1 of the present invention.

A display system 300 includes the smartphone 100 and a television 200.

The smartphone 100 is an example of a mobile information terminal, and executes various processes such as the search process, aside from the processes for outputting video and audio. The smartphone 100 includes a decoder 104, a video processing unit 106, an audio processing unit 108, a mixing unit 110, a TMDS transmitting unit 112, and a CPU 114.

The decoder 104 decodes content data stored in a memory (not shown in the figure) of the smartphone 100 or content data received via a wireless communication network, and generates a video signal and an audio signal. The video processing unit 106 converts the video signal generated by the decoder 104 into a signal in the optimal video format (resolution) that can be received at the receiver-side (television 200). The audio processing unit 108 converts the audio signal generated by the decoder 104 into a signal in the optimal audio format (sampling frequency/quantization level/number of channels, etc.) that can be received at the receiver-side (television 200). The mixing unit 110 mixes the video signal and the audio signal on which the predetermined processes have been performed by the video processing unit 106 and the audio processing unit 108, respectively, with control information for controlling the reproduction of the video signal and the audio signal, to convert the video signal and the audio signal into a transition minimized differential signaling (TMDS) digital signal. The TMDS transmitting unit 112 transmits the digital signal after the conversion by the mixing unit 110, to the television 200. The CPU 114 controls the operations of the video processing unit 106, the sound processing unit 108, the mixing unit 110, and the TMDS transmitting unit 112. The CPU 114 includes a scratch pad 116. The scratch pad 116 is a type of register that is supported by the MHL standard, and the data stored in the scratch pad 116 and the data stored in a scratch pad 214 of the television 200 to be described later are synchronized.

The television 200 includes a TMDS receiving unit 202, a video processing unit 204, an audio processing unit 206, a display 208, speakers 210, and a CPU 212.

The TMDS receiving unit 202 is connected to the TMDS transmitting unit 112 of the smartphone 100 via an MHL TMDS transmission line 302, receives the digital signal transmitted from the TMDS transmitting unit 112, and separates the received digital signal into the video signal, the audio signal, and the control information. The video processing unit 204 converts the video signal obtained through the separation by the TMDS receiving unit 202 into a video signal in a format displayable on the display 208. The audio processing unit 206 converts the audio signal obtained through the separation by the TMDS receiving unit 202 into an audio signal in a format that can be output from the speakers 210. The display 208 displays the video signal after the conversion by the video processing unit 204. The speakers 210 output the audio signal after the conversion by the audio processing unit 206. The CPU 212 controls the operation of the TMDS receiving unit 202, the video processing unit 204, and the audio processing unit 206. In particular, the CPU 212 controls the operational timings of the video processing unit 204 and the audio processing unit 206 based on the control information obtained through the separation by the TMDS receiving unit 202, so that video and audio are output from the display 208 and the speakers 210 at the appropriate timing.

The CPU 212 includes the scratch pad 214. The scratch pad 214 is a type of register supported by the MHL standard, and the data stored in the scratch pad 214 and the data stored in the scratch pad 116 of the smartphone 100 are synchronized. In other words, when data stored in one of the scratch pad 116 and the scratch pad 214 is updated through the addition, changing, deletion, and so on, of data, such updating is also reflected in the other. The data to be synchronized is exchanged between the smartphone 100 and the television 200 via a CBUS line 304.

The aforementioned TMDS transmission line 302 and the CBUS line 304 are included inside an MHL cable connecting the smartphone 100 and the television 200.

Figure 3:
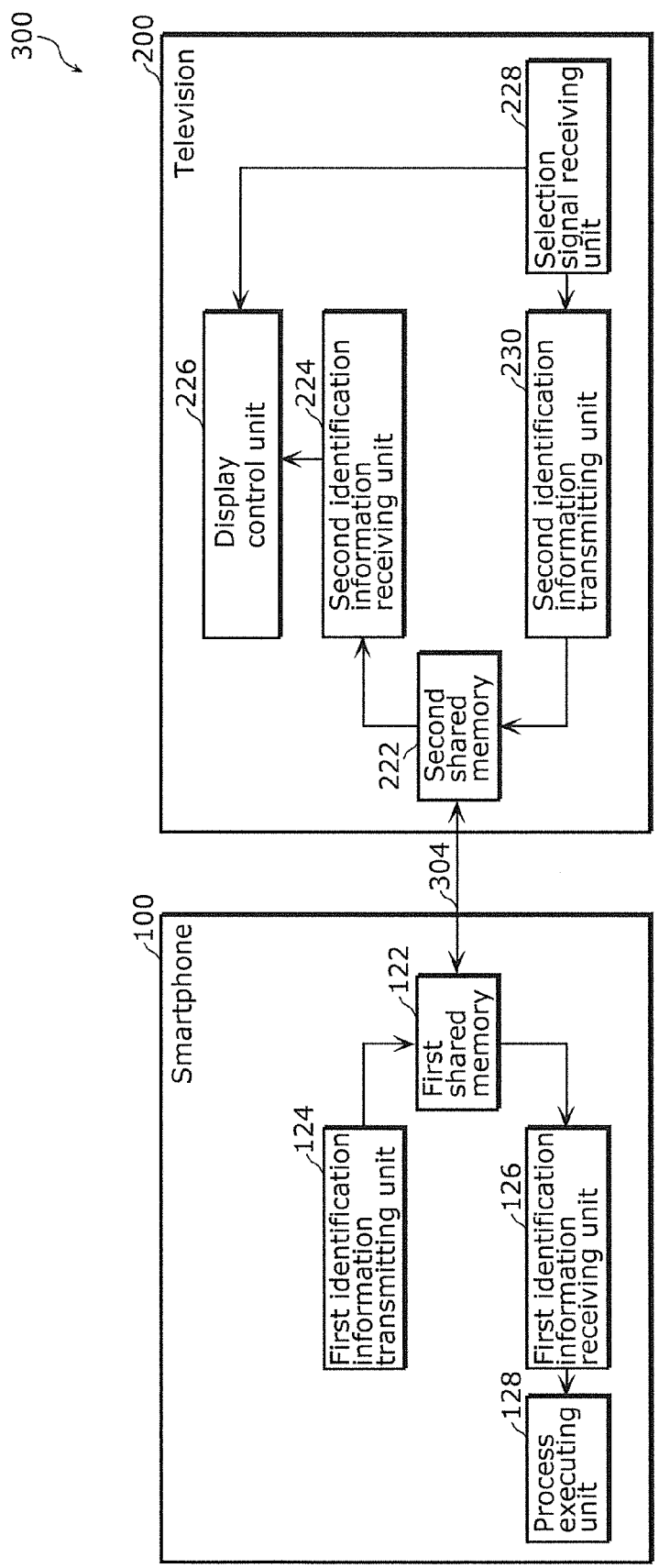
FIG. 3 is a block diagram showing a functional configuration of display system according to Embodiment 1 of the present invention.

FIG. 3 is a block diagram showing a functional configuration of the display system 300.

The display system 300 includes the smartphone 100 and the television 200.

The smartphone 100 includes a first shared memory 122, a first identification information transmitting unit 124, a first identification information receiving unit 126, and a process executing unit 128.

The first shared memory 122 is used for sharing data with the television 200. For example, the first shared memory 122 is the scratch pad 116.

The first identification information transmitting unit 124 transmits, to the television 200, identification information items of processes of the smartphone 100 which correspond to the respective hardware keys included in the smartphone 100, by writing the identification information items in the first shared memory 122. The first identification information receiving unit 126 receives, from the television 200, the identification information item (a menu entry in menu information to be described later) of the process of the smartphone 100 that is selected by the user, by reading the identification information item from the first shared memory 122. The process executing unit 128 executes the process indicated by the identification information item selected by the user and received by the first identification information receiving unit 126. The first identification information transmitting unit 124, the first identification information receiving unit 126, and the process executing unit 128 are functional processing units which function when the CPU 114 executes a program for causing the smartphone 100 to operate.

The television 200 includes a second shared memory 222, a second identification information receiving unit 224, a display control unit 226, a selection signal receiving unit 228, and a second identification information transmitting unit 230.

The second shared memory 222 is used for sharing data with the smartphone 100, and the data of the second shared memory 222 is synchronized with the data in the first shared memory 122. For example, the second shared memory 222 is the scratch pad 214.

The second identification information receiving unit 224 receives, from the smartphone 100, identification information items of the processes of the smartphone 100 which correspond to the respective hardware keys included in the smartphone 100, by reading the respective items of identification information from the second shared memory 222. The display control unit 226 displays, on the screen, menu information having, as menu entries, the respective identification information items received by the second identification information receiving unit 224. The selection signal receiving unit 228 receives a selection signal indicating the menu entry selected by the user from among the menu entries included in the menu information. The second identification information transmitting unit 230 transmits, to the smartphone 100, information indicating the selection of an identification information item of a process corresponding to the menu entry indicated by the selection signal received by the second identification information receiving unit 224, by writing such information in the second shared memory 222. The second identification information receiving unit 224, the display control unit 226, the selection signal receiving unit 228, and the second identification information transmitting unit 230 are functional processing units which function when the CPU 212 executes a program for causing the television 200 to operate.

Hereinafter, the operation executed by the display system 300 according to Embodiment 1 shall be described in further detail while citing specific examples.

Figure 4:
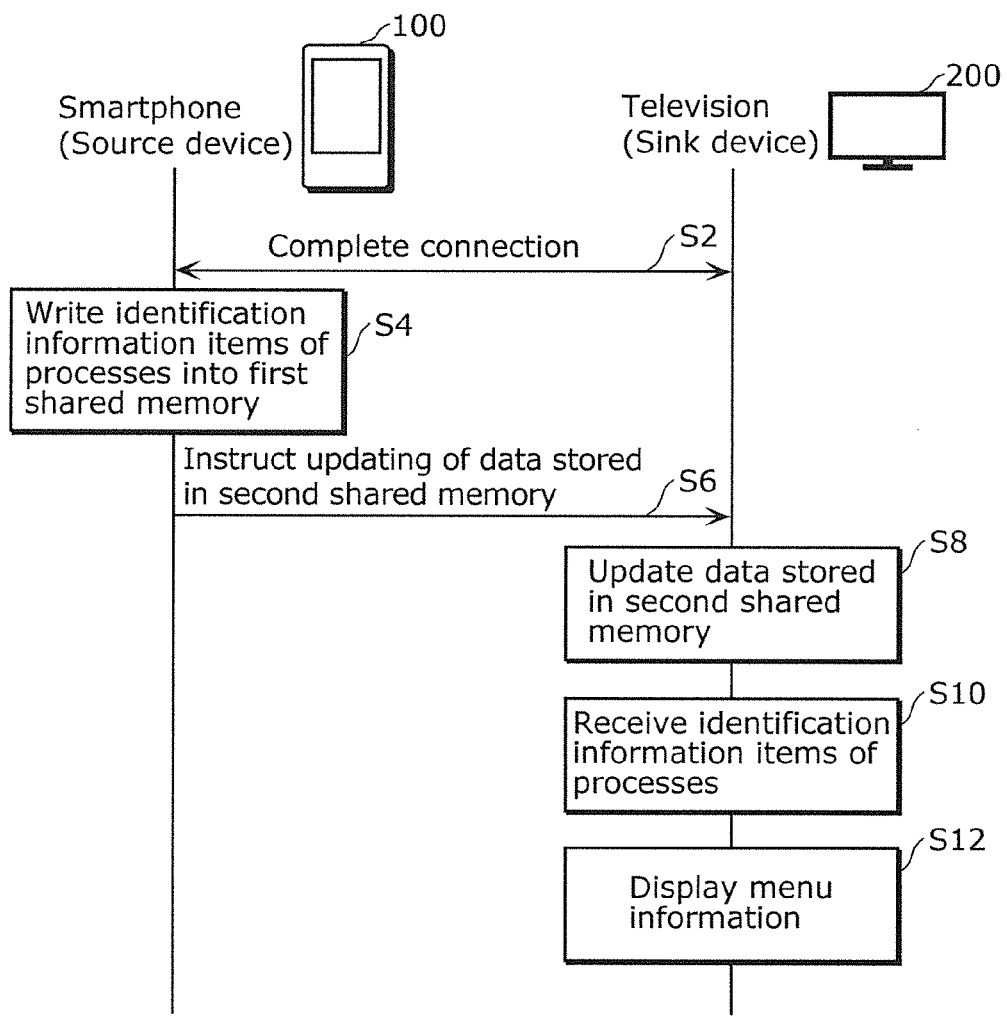
FIG. 4 is a flowchart showing the flow of processes executed at the point in time when a smartphone and a television are connected by an MHL cable.

FIG. 4 is a flowchart showing the flow of processes executed at the point in time when the smartphone 100 and the television 200 are connected by an MHL cable.

When the smartphone 100 and the television 200 are connected by the MHL cable, the smartphone 100 and the television 200 perform mutual authentication processes, and so on, to complete the connection between the smartphone 100 and the television 200 (S2).

After the connection is completed, the first identification information transmitting unit 124 writes, into the first shared memory 122, the identification information items of the processes of the smartphone 100 which correspond to the respective hardware keys included in the smartphone 100 (S4). For example, as shown in FIG. 5, the first identification information transmitting unit 124 writes, into the first shared memory 122, identification information items each made up of the pair of an identification number and a process name for each of the processes of the smartphone 100. For example, the identification information item for identification number 1 is the identification information item of the process that is executed by the smartphone 100 when the return key 1001 is pressed. In addition to the writing of identification information items, the first identification information transmitting unit 124 writes, into the first shared memory 122, selection flags in association with the respective identification information items. The identification number is a number for identifying a process of the smartphone 100, and is provided in advance for each process of the smartphone 100. The process name is a name representing the process of the smartphone 100 which is identified by the identification number. The selection flag is flag information indicating whether or not the selection signal of a menu entry (identification information item of a process) has been received by the television 200, and indicates "1" when the selection signal has been received, and "0" when otherwise. At this stage, the television 200 has not yet received a selection signal, and thus all selection flags indicate "0".

After the identification information item writing process (S4), an instruction to update the data stored in the second shared memory 222 is issued from the CPU 114 of the smartphone 100 to the CPU 212 of the television 200 (S6). In accordance with the instruction to update, the CPU 212 reads the identification information items and the selection flags from the first shared memory 122, via the CBUS line 304, and writes the identification information items and the selection flags, which were read, into the second shared memory 222 (S8). With this, the data stored in the second shared memory 222 is updated to that shown in FIG. 5.

The second identification information receiving unit 224 reads the identification information items of the processes of the smartphone 100, from the second shared memory 222. For example, the second identification information receiving unit 224 reads, from the second shared memory 222, identification information items such as those shown in FIG. 6. With this, the second identification information receiving unit 224 receives the respective identification information items from the smartphone 100, via the first shared memory 122 and the second shared memory 222 (S10).

Figure 7:
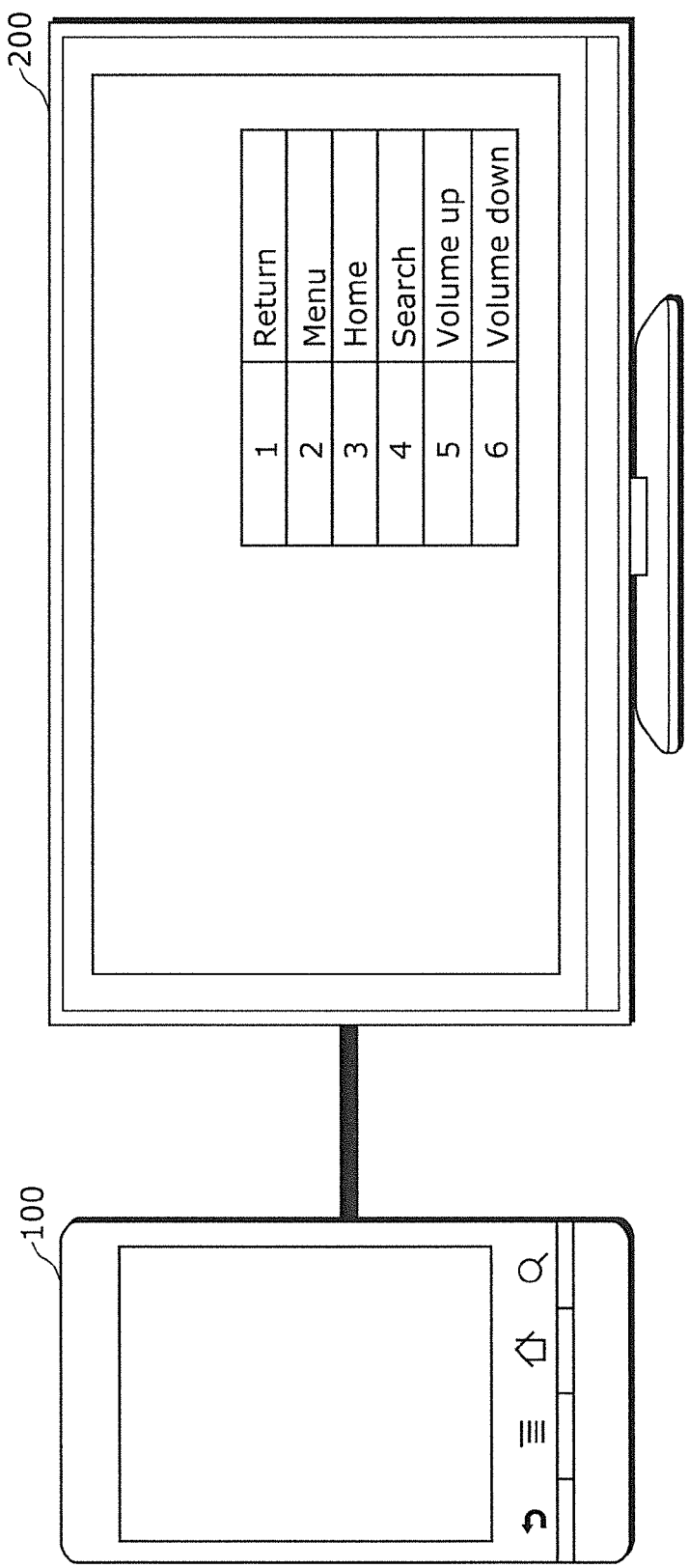
FIG. 7 is a diagram showing an example of menu information displayed on the screen of the television 200.

The display control unit 226 displays, on the screen, menu information having, as menu entries, the respective identification information items received by the second identification information receiving unit 224 (S12). FIG. 7 is a diagram showing an example of menu information displayed on the screen of the television 200. The screen of the television 200 displays menu information having the identification information items as menu entries. For example, as a first menu entry, an identification number "1" and a process name "return" are displayed.

Figure 8:
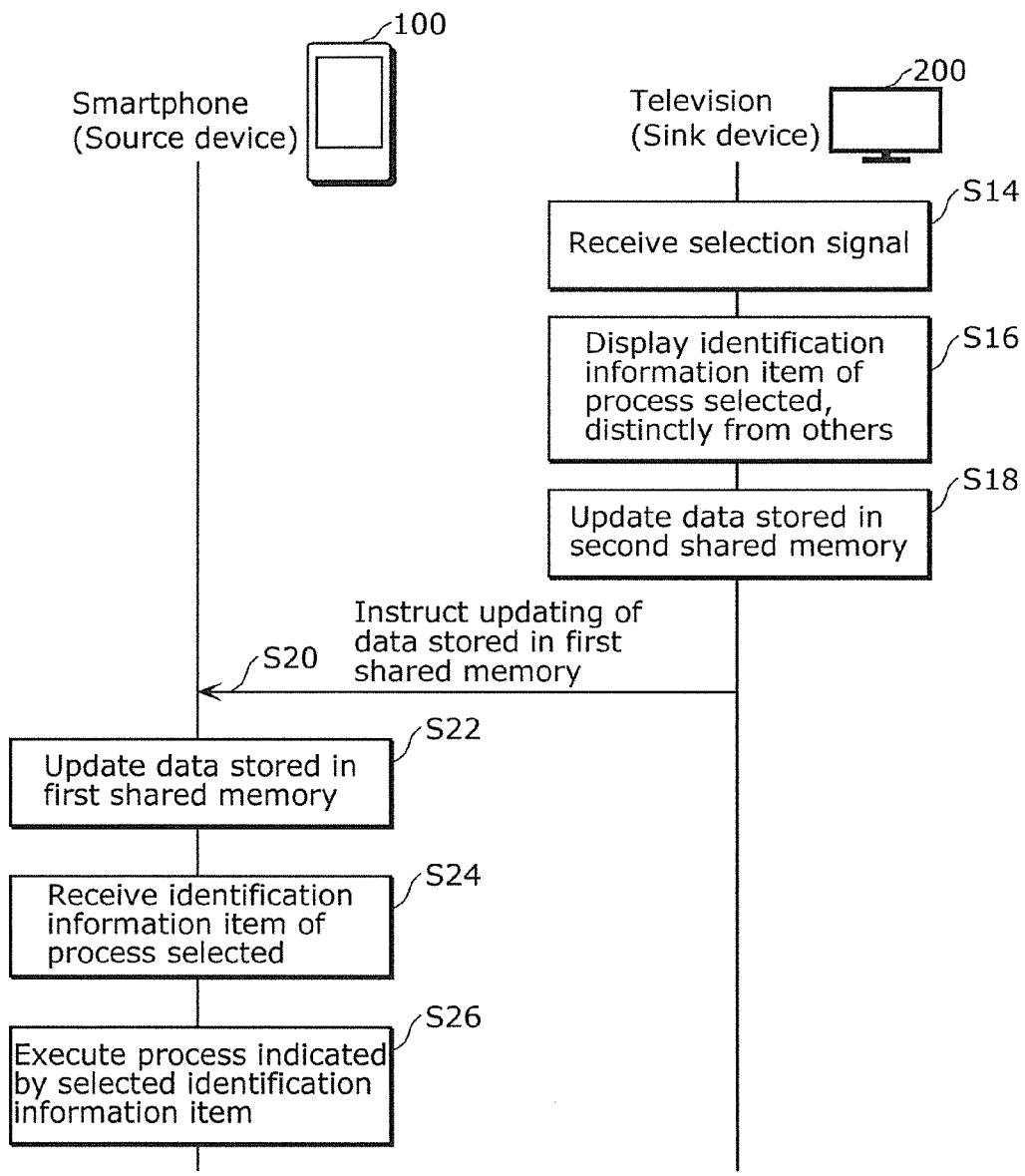
FIG. 8 is a flowchart showing the flow of processes for causing, according to the user's selection of a menu entry from the menu information, the smartphone to execute a process corresponding to the selected menu entry.

FIG. 8 is a flowchart showing the flow of processes for causing, according to the user's selection of a menu entry from the menu information, the smartphone 100 to execute a process corresponding to the selected menu entry.

Figure 9:
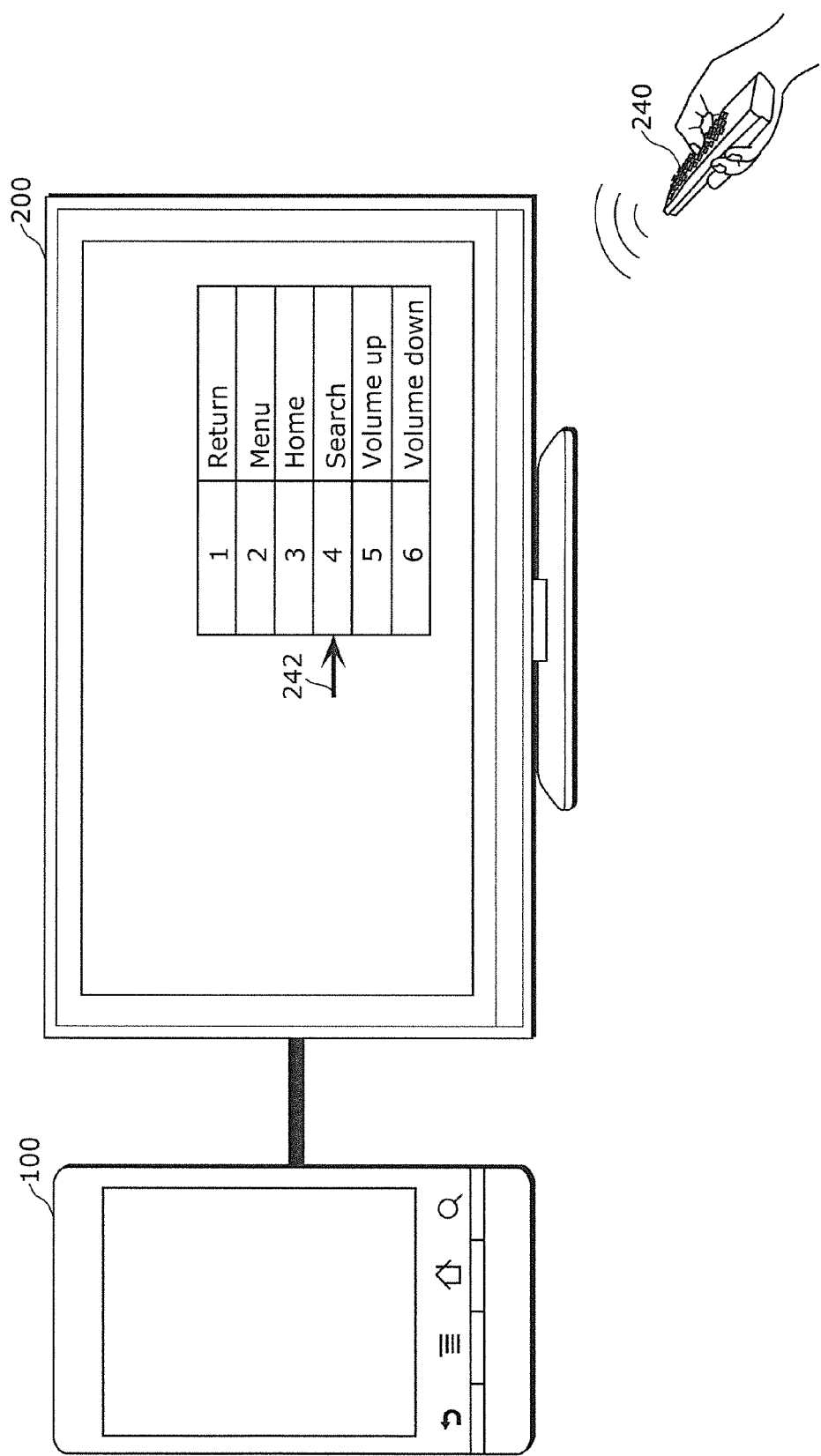
FIG. 9 is a diagram for describing the process of selecting a menu entry, performed by the user.

The user operates the remote of the television 200 to select, from the identification information items displayed on the screen of the television 200, the identification information item (menu entry) of the process that the smartphone 100 is to be made to execute. With this, the selection signal receiving unit 228 receives, from the remote, the selection signal indicating the menu entry selected by the user from among the identification information items included in the menu information (S14). At this time, the display control unit 226 displays the menu entry selected by the user distinctly from the other identification information items (S16). For example, as shown in FIG. 9, the user moves a cursor 242 to the fourth menu entry by pressing a cursor key of the remote 240 of the television 200, and presses the enter key of the remote 240 at that position. With such a process, the selection signal receiving unit 228 receives, from the remote 240, the selection signal of the fourth menu entry. In addition, the display control unit 226 displays the cursor 242 at the position of the fourth menu entry to display the fourth menu entry distinctly from the other menu entries.

When the selection of a menu entry is performed, the second identification information transmitting unit 230 updates, to "1", the value of the selection flag of the identification information item of the process corresponding to the selected menu entry, among the selection flags stored in the second shared memory 222 (S18). For example, as shown in FIG. 9, when the selection signal receiving unit 228 receives the selection signal of the fourth menu entry, the second identification information transmitting unit 230 updates, to "1", the value of the selection flag corresponding to the fourth identification information item, as shown in FIG. 10. It should be noted that there are cases where "1" is set as the value of a selection flag of a menu item that was selected in the previous selection process and is not selected in the current selection process. In this case, the second identification information transmitting unit 230 updates the value of the selection flag of such menu entry, from "1" to "0".

After the process of updating the data stored in the second shared memory 222 (S18), an instruction to update the data stored in the first shared memory 122 is issued from the CPU 212 of the television 200 to the CPU 114 of the smartphone 100 (S20). In accordance with the instruction to update, the CPU 114 reads the identification information items and the selection flags from the second shared memory 222, via the CBUS line 304, and writes the identification information items and the selection flags, which were read, into the first shared memory 122 (S22). With this, the data stored in the first shared memory 122 is updated to that shown in FIG. 10.

The first identification information receiving unit 126 receives, from the television 200, the identification information item of the process of the smartphone 100 which corresponds to the menu entry selected by the user, by reading such identification information item from the first shared memory 122 (S24). For example, when the identification information items and selection flags shown in FIG. 10 are stored in the first shared memory 122, the first identification information receiving unit 126 receives, from the television 200, the identification information item (4, Search) having a selection flag set to "1", by reading the identification information item from the first shared memory 122.

Figure 11:
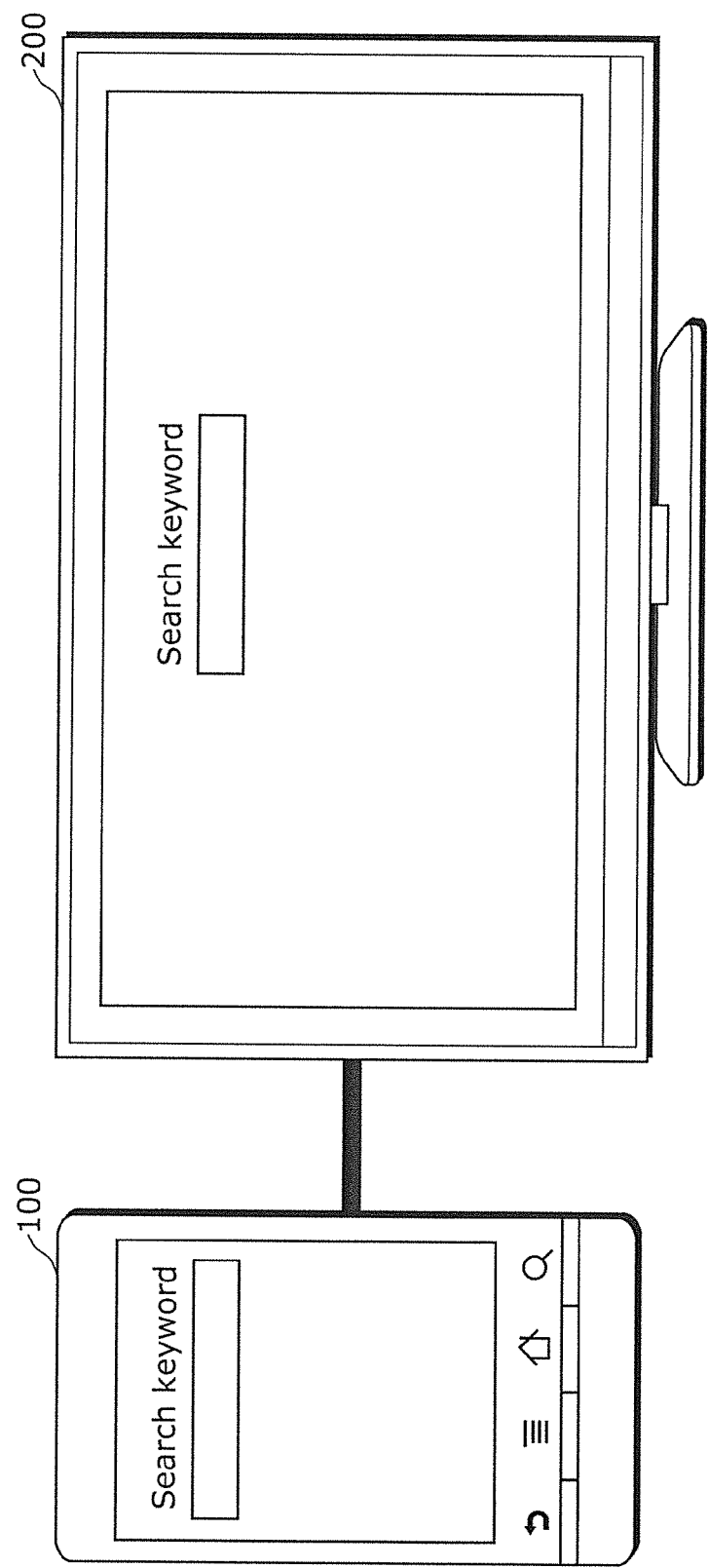
FIG. 11 is a diagram showing an example of the screens of the smartphone and the television during execution of a search process.

The process executing unit 128 executes the process indicated by the identification information item corresponding to the menu entry selected by the user, which was received, that is, read from the first shared memory 122, by the first identification information receiving unit 126 (S26). For example, when the identification information item (4, Search) is received, the process executing unit 128 executes the search process. Specifically, the process executing unit 128 connects to a search site and displays the web page of the search site on the screen, as shown in FIG. 11. The process executing unit 128 operates the video processing unit 106, the mixing unit 110, the TMDS transmitting unit 112, and so on, of the smartphone 100, and transmits the image of the web page to the television 200 via the TMDS transmitting line 302. The television 200 displays the image of the web page transmitted from the smartphone 100, on the screen of the television 200, by using the TMDS receiving unit 202 and the video processing unit 204. With this, the user can perform an internet search by operating the remote 240 of the television 200 while looking at the screen of the television 200.

Figure 12:
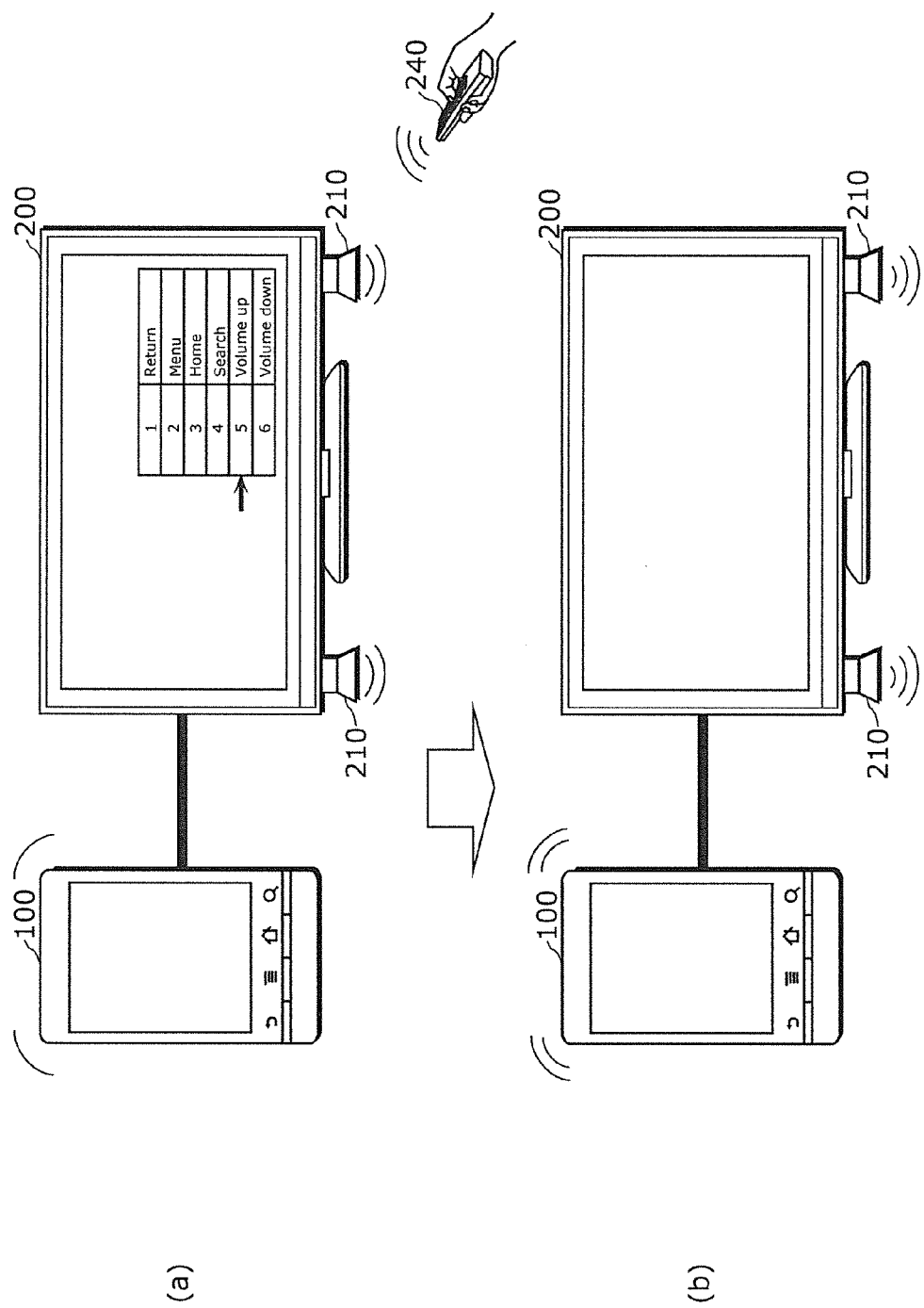
FIG. 12 is a diagram for describing a process of updating selection flags when a fifth menu entry is selected.

Furthermore, when viewing, on the television 200, content reproduced in the smartphone 100, there are cases where, in order to increase the volume because the volume is small, the user increases the volume of the speakers 210 by operating the remote of the television 200. However, even when operating the remote to increase the volume of the speakers 210, there are cases where the volume does not increase. This is because the reproduced volume of the content in the smartphone 100 is small. In such a case, normally, it is necessary to increase the reproduced volume of the content by pressing the volume up key 1007 of the smartphone 100. In this embodiment, as shown in (a) in FIG. 12, instead of directly pressing the volume up key 1007, the user selects the fifth menu entry for increasing the reproduced volume of the content, from the menu information displayed by the television 200. Accordingly, as shown in (b) in FIG. 12, the reproduced volume of the content reproduced in the smartphone 100 can be increased, and with this, the volume from the speakers 210 of the television 200 can be increased.

As described above, according to Embodiment 1, it is possible to cause the smartphone 100 to execute processes associated with hardware keys of the smartphone 100, by operating the television 200.

Furthermore, the second identification information receiving unit 224 receives the respective identification information items from the smartphone 100 which is connected to the television 200. As such, regardless of the type of the smartphone 100 that is connected to the television 200, the user can cause the smartphone 100 to execute the processes associated with the hardware keys, by operating the television 200.

Furthermore, since each of the smartphone 100 and the television 200 uses an MHL scratch pad, the exchange of identification information items and selection flags can be carried out using a simple method.

Furthermore, flag information items each indicating whether or not an identification information item is selected are written into each scratch pad. As such, the selected identification information item can be notified, from the television 200 to the smartphone 100 using a simple method.

Modification of Embodiment 1

Figure 13:
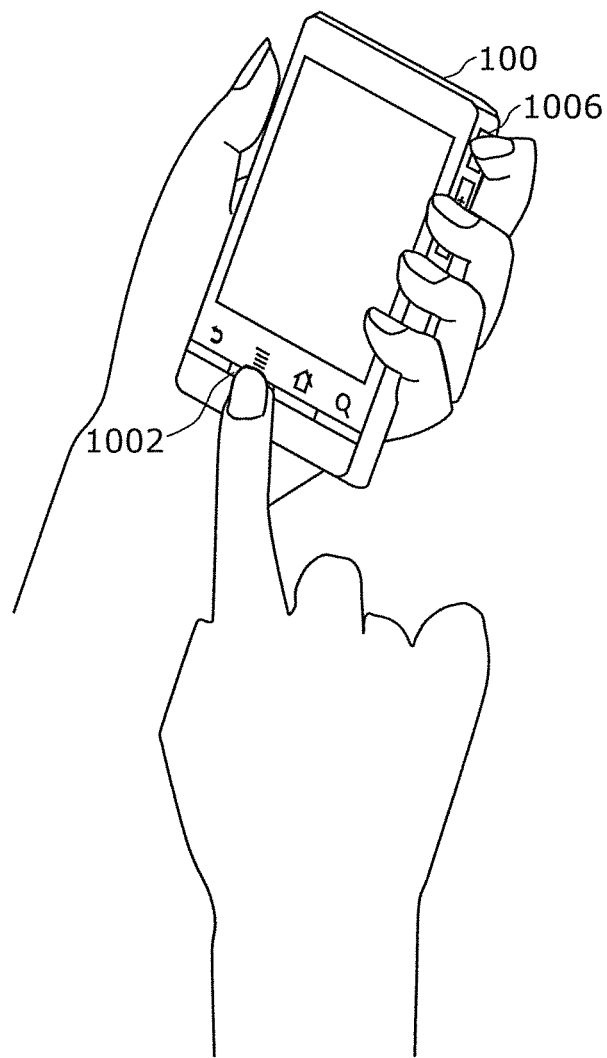
FIG. 13 is a diagram showing an example of a state in which two hardware keys are pressed simultaneously.

In Embodiment 1, an example is described in which the remote 240 of the television 200 is used to cause the smartphone 100 to execute the process that is executed when the user presses each of the hardware keys provided in the smartphone 100. However, there also processes that are executed by way of the user pressing two or more of the hardware keys provided in the smartphone 100. When the user presses two hardware keys simultaneously, the smartphone 100 executes a process corresponding to the combination of the pressed hardware keys. For example, as shown in FIG. 13, when the user presses the menu key 1002 and the power key 1006 simultaneously, the smartphone 100 executes a screenshot process of temporarily storing the image displayed on the screen 102 into the memory. FIG. 13 shows the state in which the menu key 1002 is pressed using the index finger of the right hand, and the power key 1006 is pressed using the index finger of the left hand. In this modification, an example is described in which the remote 240 of the television 200 is used to thereby cause the smartphone 100 to execute a process which is executed when the user presses two or more hardware keys simultaneously.

For example, in the process identification information item writing process (S4), the first identification information transmitting unit 124 writes, as the seventh identification information item, the identification information item of a screenshot process such as that shown in FIG. 14 into the first shared memory 122, and writes the selection flag corresponding thereto in the first shared memory 122.

Figure 15:
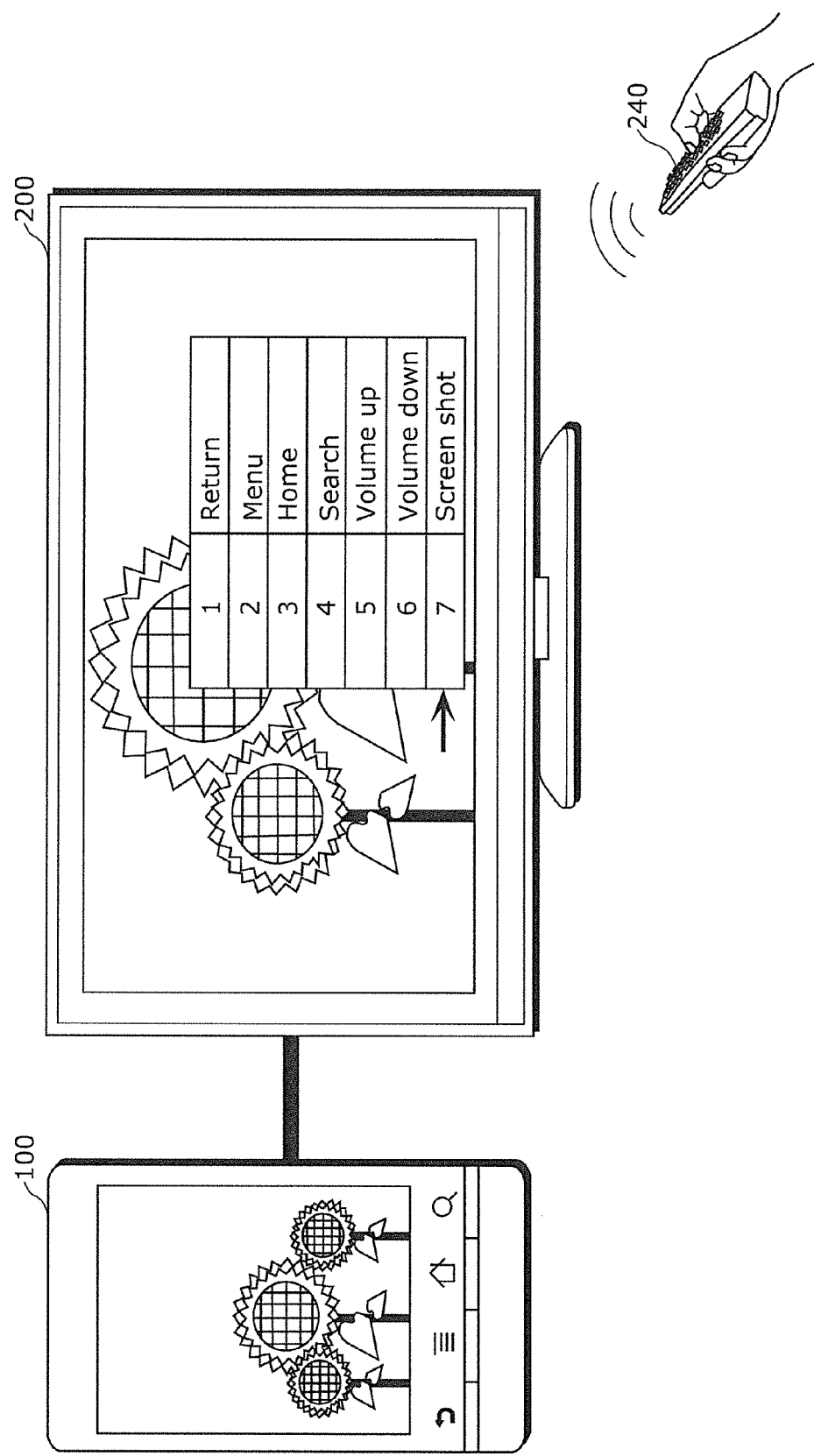
FIG. 15 is a diagram for describing a process of selecting a menu entry, performed by the user.

With this, the menu information in which the seventh identification information item has been added is displayed on the screen of the television 200, as shown in FIG. 15. By way of the user selecting the seventh menu entry (identification information item) by operating the remote 240 of the television 200, the data stored in the first shared memory 122 and the second shared memory 222 are updated to that shown in FIG. 16, in the processes in S18 to S22.

In the executing process (S26), the process executing unit 128 executes the screenshot process indicated by the seventh identification information item selected by the user.

In this manner, the identification information item of a process executed when two hardware keys are pressed simultaneously is handled in the same manner as the identification information item of a process executed when a single hardware key is pressed. Accordingly, by using the remote 240 of the television 200, the user can cause the smartphone 100 to execute a process that is executed when two hardware keys are pressed simultaneously.

Embodiment 2

In Embodiment 1, identification numbers and process names are displayed as menu information. However, there are cases where a user operating a smartphone operates the hardware keys without thinking about the process names. For such a user, displaying icon images of the hardware keys of the smartphone on the television screen allows for more intuitive operation of the smartphone than displaying the process names on the television screen. In this embodiment, instead of displaying the menu information on the television screen, icon images of the hardware keys of the smartphone are displayed.

Hereinafter, description shall be carried out centering on the points of difference with Embodiment 1, and description of portions that are the same as in Embodiment 1 shall be omitted as appropriate.

The hardware configuration of the display system according to Embodiment 2 is the same as the hardware configuration of the display system according to Embodiment 1 shown in FIG. 2. As such, detailed description thereof shall not be repeated.

Figure 17:
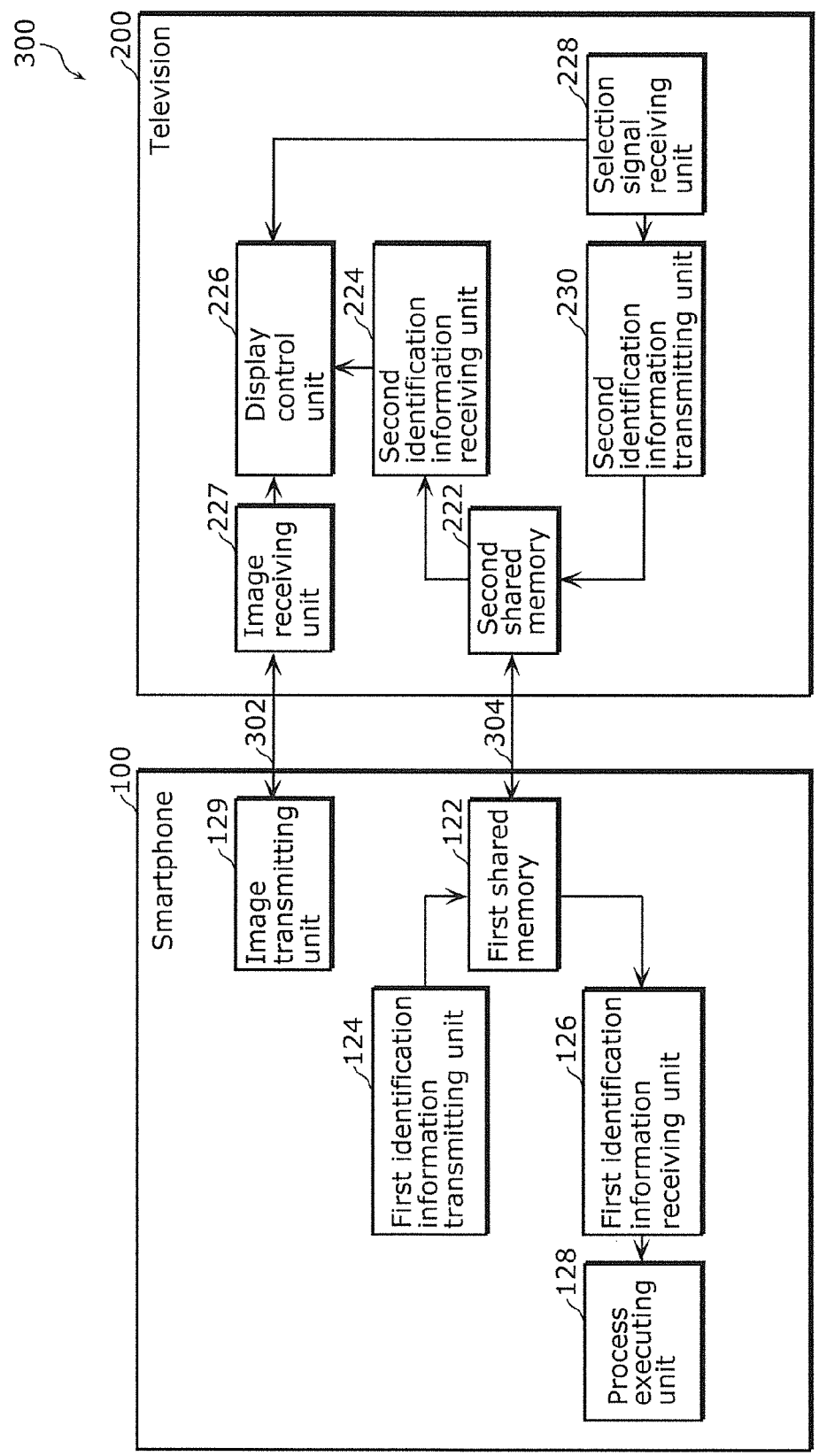
FIG. 17 is a block diagram showing a functional configuration of a display system according to Embodiment 2 of the present invention.

FIG. 17 is a block diagram showing a functional configuration of the display system 300.

The display system 300 shown in FIG. 17 includes some processing units which are added to the configuration of the display system 300 shown in FIG. 3. Specifically, an image transmitting unit 129 is added to the smartphone 100 and an image receiving unit 227 is added to the television 200.

The image transmitting unit 129 transmits, to the television 200, image icons of the respective hardware keys included in the smartphone 100. The image transmitting unit 129 includes the decoder 104, the video processing unit 106, the mixing unit 110, the TMDS transmitting unit 112, and so on.

The image receiving unit 227 receives, from the smartphone 100, the image icons of the respective hardware keys included in the smartphone 100. The image receiving unit 227 is configured of the TMDS receiving unit 202.

The other structural elements of the smartphone 100 and the television 200 have the same functions as the structural elements of the smartphone 100 and the television 200 shown in FIG. 3. As such, detailed description thereof shall not be repeated.

Hereinafter, the operation executed by the display system 300 according to Embodiment 2 shall be described in further detail while citing specific examples.

Figure 18:
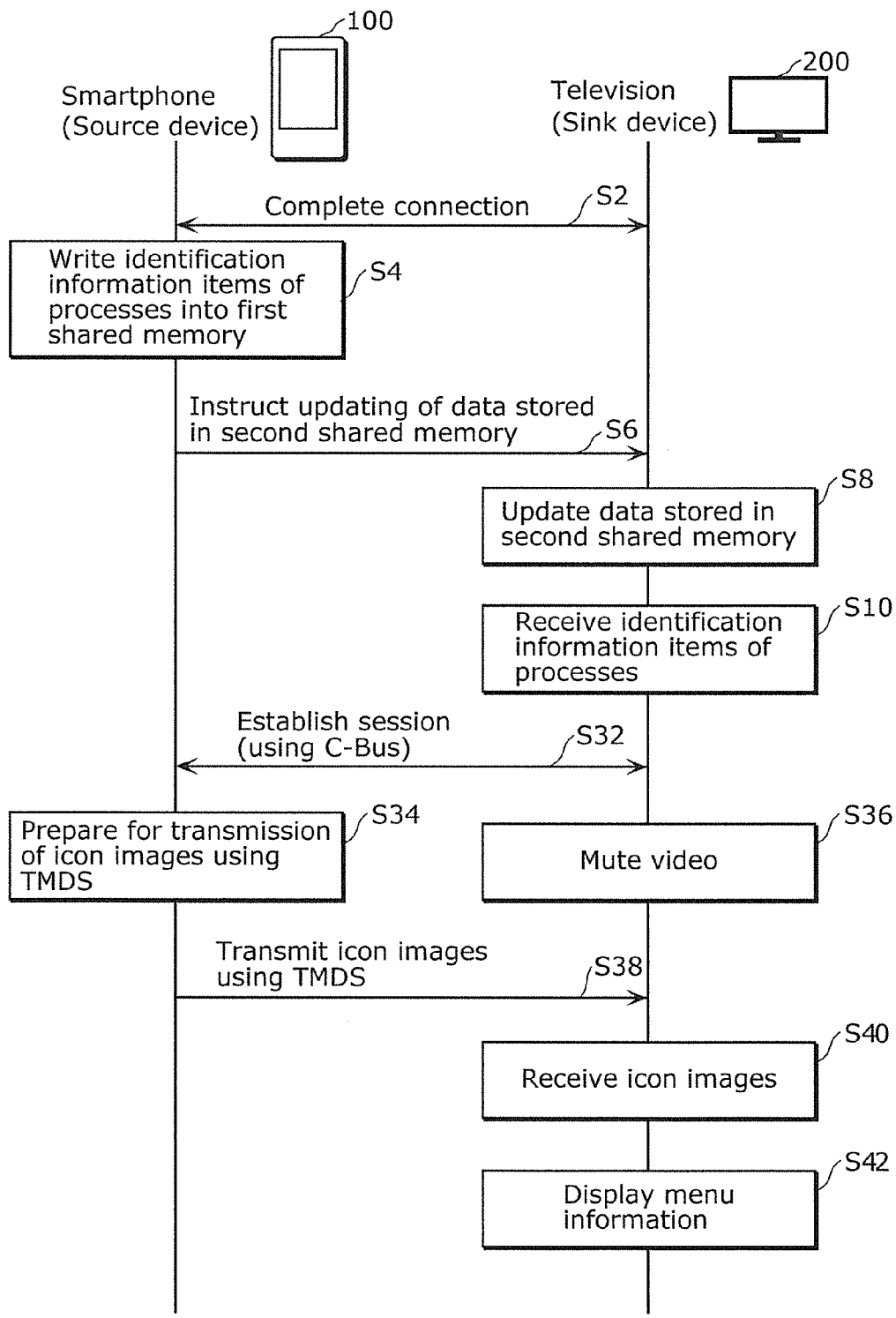
FIG. 18 is a flowchart showing the flow of processes executed at the point in time when a smartphone and a television are connected by an MHL cable.

FIG. 18 is a flowchart showing the flow of processes executed at the point in time when the smartphone 100 and the television 200 are connected by an MHL cable.

The processes in S2 to S10 are the same as those shown in FIG. 4, and thus detailed description thereof shall not be repeated here.

After S10, a session for transmitting the icon images via the TMDS transmission line 302 is established between the image transmitting unit 129 and the image receiving unit 227 (S32).

After the session is established, the image transmitting unit 129 prepares for the transmission of the image icons of the hardware keys of the smartphone 100 (S34). Specifically, the image transmitting unit 129 converts the icon images stored in the memory (not shown in the figure) of the smartphone 100 into data in a format that can be transmitted to the television 200 via the TMDS transmission line 302.

Meanwhile, the display control unit 226 of the television 200 mutes the video (S36). This is to prevent the icon images received from the smartphone 100 from being displayed on the screen.

After the processes in S34 and S36, the image transmitting unit 129 transmits the icon images, from the TMDS transmitting line 302 to the image receiving unit 227 (S38). It should be noted that the identification number of the identification information item is assigned to the corresponding icon image as attached information.

The image receiving unit 227 receives the icon images transmitted from the image transmitting unit 129 (S40).

Figure 19:
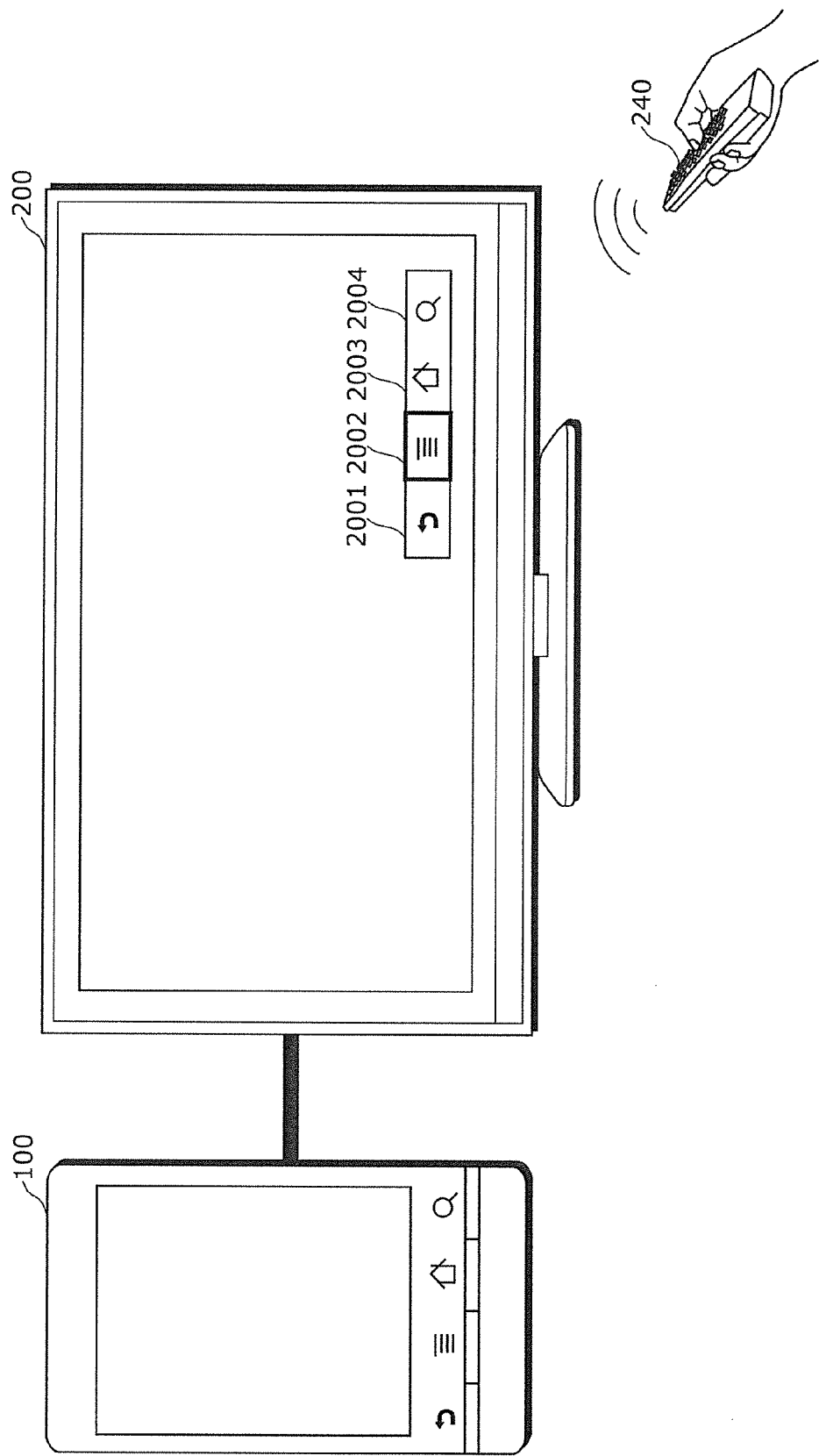
FIG. 19 is a diagram showing an example of icon images displayed on the screen of a television.
Figure 20:
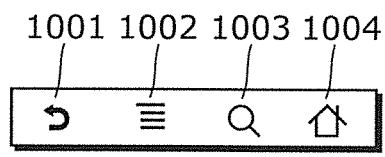
FIG. 20 is external view of an example of a hardware key portion of a smartphone.
Figure 21:
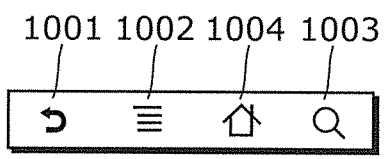
FIG. 21 is external view of an example of a hardware key portion of a smartphone.
Figure 22:
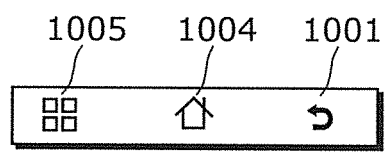
FIG. 22 is external view of an example of a hardware key portion of a smartphone.

In place of menu information such as that shown in FIG. 7, the display control unit 226 displays the icon images received by the image receiving unit 227, on the screen of the television 200 (S42). FIG. 19 is a diagram showing an example of icon images displayed on the screen of the television 200. As shown in FIG. 19, icon images 2001 to 2004 are displayed on the screen of the television 200. The icon image 2001 is the icon image of the return key 1001, the icon image 2002 is the icon image of the menu key 1002, the icon image 2003 is the icon image of the search key 1003, and the icon image 2004 is the icon image of the home key 1004. The user selects a single icon image from among the icon images 2001 to 2004 displayed on the screen of the television 200, by operating the remote 240 of the television 200.

The flow of processes in the display system 300 after the user selects an icon image is the same as that shown in FIG. 8. Hereinafter, the portions that are different shall be described using FIG. 8.

With regard to the selection signal receiving process (S14), in Embodiment 1, the selection signal receiving unit 228 receives the selection signal indicating the menu entry selected by the user, whereas, in Embodiment 2, the selection signal receiving unit 228 receives the selection signal indicating the icon image selected by the user, and identifies the identification information item of the selected process from the identification number which is the attached information of the icon image.

The subsequent processes are the same as the processes from S16 onward in FIG. 8, except for the point that the identification information item identified by the selection signal receiving unit 228 is used in place of the menu entry (identification information item) selected by the user. As such, detailed description thereof shall not be repeated.

As described above, in addition to the operation and effect described in Embodiment 1, according to Embodiment 2, the icon images of the hardware keys of the smartphone 100 are displayed on the screen of the television 200. The user is able to operate the smartphone 100 by selecting an icon image by operating the remote 240, and so on, of the television 200. As such, the user is able to intuitively select the identification information item of the process of the smartphone 100, compared to the case of selecting a menu entry from menu information.

Although the display system according to exemplary embodiments and modifications thereof of the present invention have been described thus far, the present invention is not limited to such embodiments and modifications.

For example, the hardware keys of the smartphone 100 shown in FIG. 1 are merely examples, and the types and positions of the hardware keys are not limited to those shown in FIG. 1.

Furthermore, description is carried out with each of the scratch pad 116 and the scratch pad 214 being a type of register. However, as long as the data stored in the scratch pad 116 and the scratch pad 214 can be synchronized, each of the scratch pad 116 and the scratch pad 214 may be provided in a main storage device, and so on, such as an external memory of the CPU.

Furthermore, the respective devices described above may be specifically configured as a computer system made up of a microprocessor, a ROM, a RAM, a hard disk drive, a display unit, a keyboard, a mouse, and so on. A computer program is stored in the RAM or the hard disk drive. The respective devices achieve their functions by way of the microprocessor operating according to the computer program. Here, the computer program is configured of a combination of command codes indicating commands to the computer in order to achieve a predetermined function.

Moreover, some or all of the structural elements included in each of the above-described devices may be realized as a single system Large Scale Integration (LSI). The system LSI is a super multifunctional LSI manufactured by integrating a plurality of components onto a signal chip. More specifically, the system LSI is a computer system configured with a microprocessor, a ROM, a RAM, and so forth. The RAM stores a computer program. The microprocessor operates according to the computer program, so that a function of the system LSI is carried out.

Furthermore, some or all of the structural elements included in each of the above-described devices may be implemented as an IC card or a standalone module that can be inserted into and removed from the corresponding device. The IC card or the module is a computer system configured with a microprocessor, a ROM, a RAM, and so forth. The IC card or the module may include the aforementioned super multifunctional LSI. The microprocessor operates according to the computer program, so that a function of the IC card or the module is carried out. The IC card or the module may be tamper resistant.

Moreover, the present invention may be the methods described above. Furthermore, the present invention may be a computer program for implementing such methods using a computer, or may be a digital signal of the computer program.

Furthermore, the present invention may be the aforementioned computer program or digital signal recorded on a non-transitory computer-readable recording medium, such as a flexible disk, a hard disk, a CD-ROM, an MO, a DVD, a DVD-ROM, a DVD-RAM, a Blu-ray Disc (BD) (registered trademark), or a semiconductor memory. Also, the present invention may be the digital signal recorded on such non-transitory recording mediums.

Moreover, the present invention may be the aforementioned computer program or digital signal transmitted via a telecommunication line, a wireless or wired communication line, a network represented by the Internet, and data broadcasting.

Furthermore, the present invention may be a computer system including a microprocessor and a memory. The memory may store the aforementioned computer program and the microprocessor may operate according to the computer program.

Moreover, by transferring the non-transitory recording medium having the aforementioned program or digital signal recorded thereon or by transferring the aforementioned program or digital signal via the aforementioned network or the like, the present invention may be implemented by a different independent computer system.

In addition, the above-described exemplary embodiments and the above-described modification may be combined with each other.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to a television that is connected to a smartphone, and is particularly applicable to a television, or the like, that displays on a screen video reproduced by a smartphone.

The invention claimed is:
1. A display device comprising:
a shared memory which is used for sharing data with a mobile information terminal, and into which one or more identification information items of respective processes corresponding to one or more hardware keys, each of which is a physical key located outside a screen of the mobile information terminal and not displayed on the screen, are written from the mobile information terminal;

an identification information receiving unit configured to receive the one or more identification information items from the mobile information terminal, by reading the one or more identification information items from the shared memory; and an identification information transmitting unit configured to transmit, to the mobile information terminal, information indicating selection of one of the one or more identification information items, by writing the information into the shared memory.

2. The display device according to claim 1, further comprising:

a display control unit configured to display, on a screen of the display device, menu information having the one or more identification information items received by the identification information receiving unit as corresponding one or more menu entries; and a selection signal receiving unit configured to receive a selection signal indicating a menu entry selected by a user from among the one or more menu entries included in the menu information, wherein the identification information transmitting unit is configured to transmit, to the mobile information terminal, information indicating selection of the identification information item corresponding to the menu entry indicated by the selection signal received by the selection signal receiving unit, by writing the information into the shared memory.

3. The display device according to claim 2, wherein the identification information receiving unit is further configured to receive, from the mobile information terminal, an identification information item of a process that is executed through simultaneous pressing of two or more of the hardware keys, by reading the identification information item from the shared memory.

4. The display device according to claim 2, wherein the mobile information terminal includes a first scratch pad which is a Mobile High-definition Link (MHL) scratch pad, the shared memory is a second scratch pad which is an MHL scratch pad, and the identification information receiving unit is configured to receive, from the mobile information terminal, the one or more identification information items that are written into the second scratchpad by being written into the first scratch pad by the mobile information terminal, by reading the one or more identification information items from the second scratch pad.

5. The display device according to claim 4, wherein each of the first scratch pad and the second scratch pad stores, for each of the processes of the mobile information terminal, the identification information item of the process and a flag information item indicating whether or not a selection signal corresponding to the process is received, and the identification information transmitting unit is configured to transmit, to the mobile information terminal, the identification information item corresponding to the selection signal received by the selection signal receiving unit, by updating the flag information item stored in the first scratch pad which is the flag information item of the process corresponding to the selection signal received by the selection signal receiving unit, by updating the flag information item stored in the second scratch pad, which corresponds to the flag information stored in the first scratch pad.

6. The display device according to claim 1, further comprising:

an image receiving unit configured to receive one or more icon images of the corresponding one or more hardware keys from the mobile information terminal;

a display control unit configured to display the one or more icon images on a screen of the display device; and a selection signal receiving unit configured to receive a selection signal of one of the one or more icon images displayed on the screen, wherein the identification information transmitting unit is configured to transmit, to the mobile information terminal, information indicating selection of the identification information item of the process of the hardware key corresponding to the icon image indicated by the selection signal received by the selection signal receiving unit, by writing the information into the shared memory.

7. A display system comprising:

a mobile information terminal; and a display device, wherein the mobile information terminal includes:

a first shared memory used for sharing data with the display device;

a first identification information transmitting unit configured to transmit, to the display device, an identification information item of a process corresponding to a hardware key which is a physical key located outside a screen of the mobile information terminal and not displayed on the screen, by writing the identification information item into the first shared memory;

a first identification information receiving unit configured to receive, from the display device, information indicating that the identification information item is selected by the display device, by reading the information from the first shared memory; and a process executing unit configured to execute the process indicated by the identification information item corresponding to the information received by the first identification information receiving unit, and the display device includes:

a second shared memory used for sharing data with the mobile information terminal, the data being synchronized with data stored in the first shared memory;

a second identification information receiving unit configured to receive the identification information item from the mobile information terminal, by reading the identification information item from the second shared memory; and a second identification information transmitting unit configured to transmit, to the mobile information terminal, the information indicating the selection of the identification information item, by writing the information into the second shared memory.

8. A mobile information terminal comprising:

a shared memory used for sharing data with a display device;

an identification information transmission unit configured to transmit, to the display device, an identification information item of a process corresponding to a hardware key which is a physical key located outside a screen of the mobile information terminal and not displayed on the screen, by writing the identification information item into the shared memory;

an identification information receiving unit configured to receive, from the display device, information written in the shared memory and indicating that the identification information item is selected by the display device, by reading the information from the shared memory; and a process executing unit configured to execute the process indicated by the identification information item corresponding to the information received by the identification information receiving unit.

9. A method for controlling the display device according to claim 1 which is connected to the mobile information terminal, the method comprising:

receiving the identification information item from the mobile information terminal, by reading the identification information item from the shared memory; and transmitting, to the mobile information terminal, the information indicating selection of the identification information item received in the receiving, by writing the information into the shared memory.

10. A display device comprising:

a shared memory which is used for sharing data with a mobile information terminal, and into which one or more identification information items of respective processes corresponding to one or more hardware keys included in the mobile information terminal are written from the mobile information terminal;

an identification information receiving unit configured to receive the one or more identification information items from the mobile information terminal, be reading the one or more identification information items from the shared memory; and an identification information transmitting unit configured to transmit, to the mobile information terminal, information indicating selection of one of the one or more identification information items, by writing the information into the shared memory, wherein the mobile information terminal includes a first scratch pad which is Mobile High-definition Link (MHL) scratch pad, the shared memory is a second scratch pad which is an MHL scratch pad, and the identification information receiving unit is configured to receive, from the mobile information terminal, the one or more identification information items that are written into the second scratchpad by being written into the first scratch pad by the mobile information terminal, by reading the one or more identification information items from the second scratch pad.

* * * * *